Jan. 3, 1950 E. V. GARNETT 2,492,980
TRAILER FOR TRANSPORTING AUTOMOBILES
Filed March 10, 1947 3 Sheets-Sheet 1
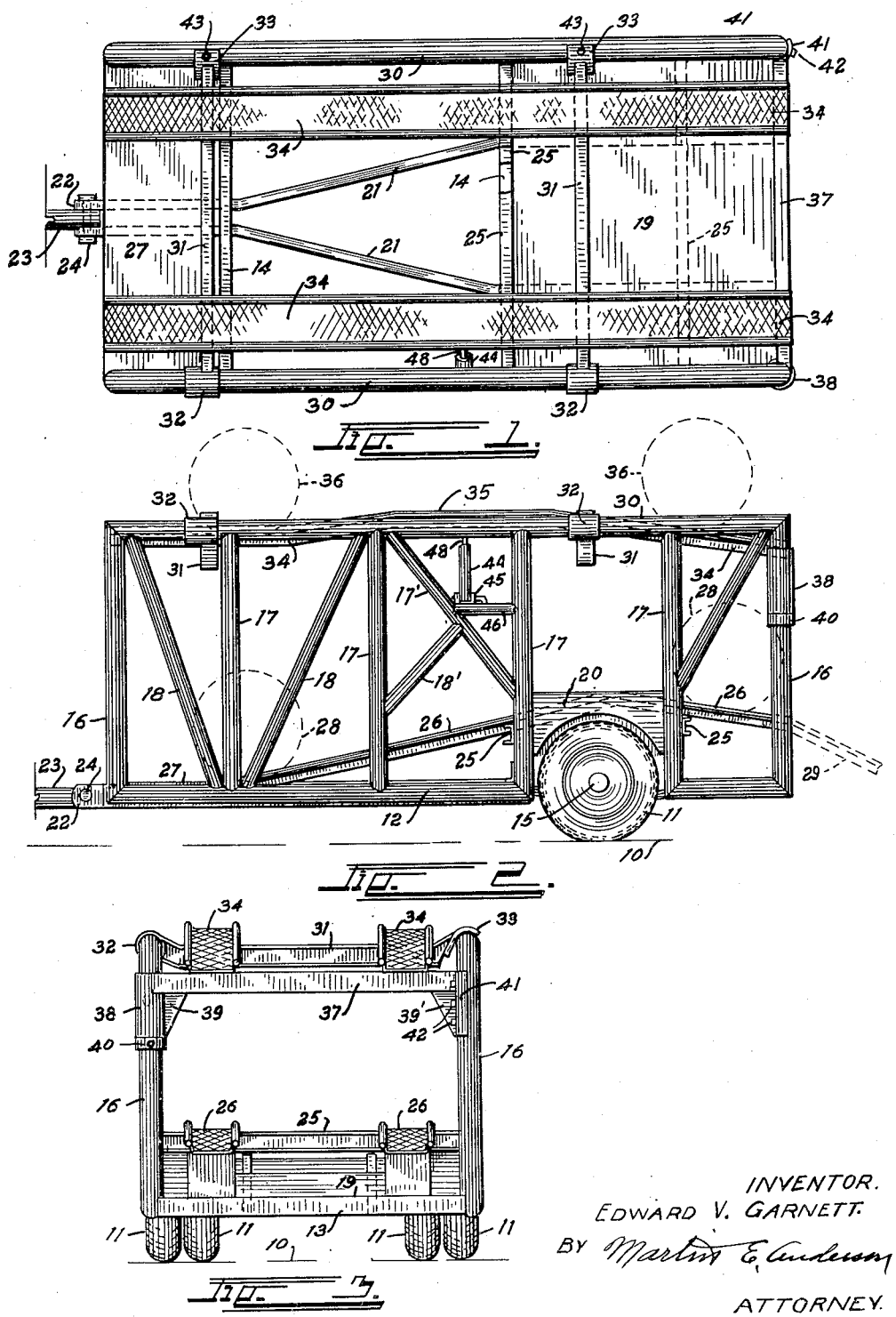
INVENTOR.
EDWARD V. GARNETT.
BY Martin E. Anderson
ATTORNEY.

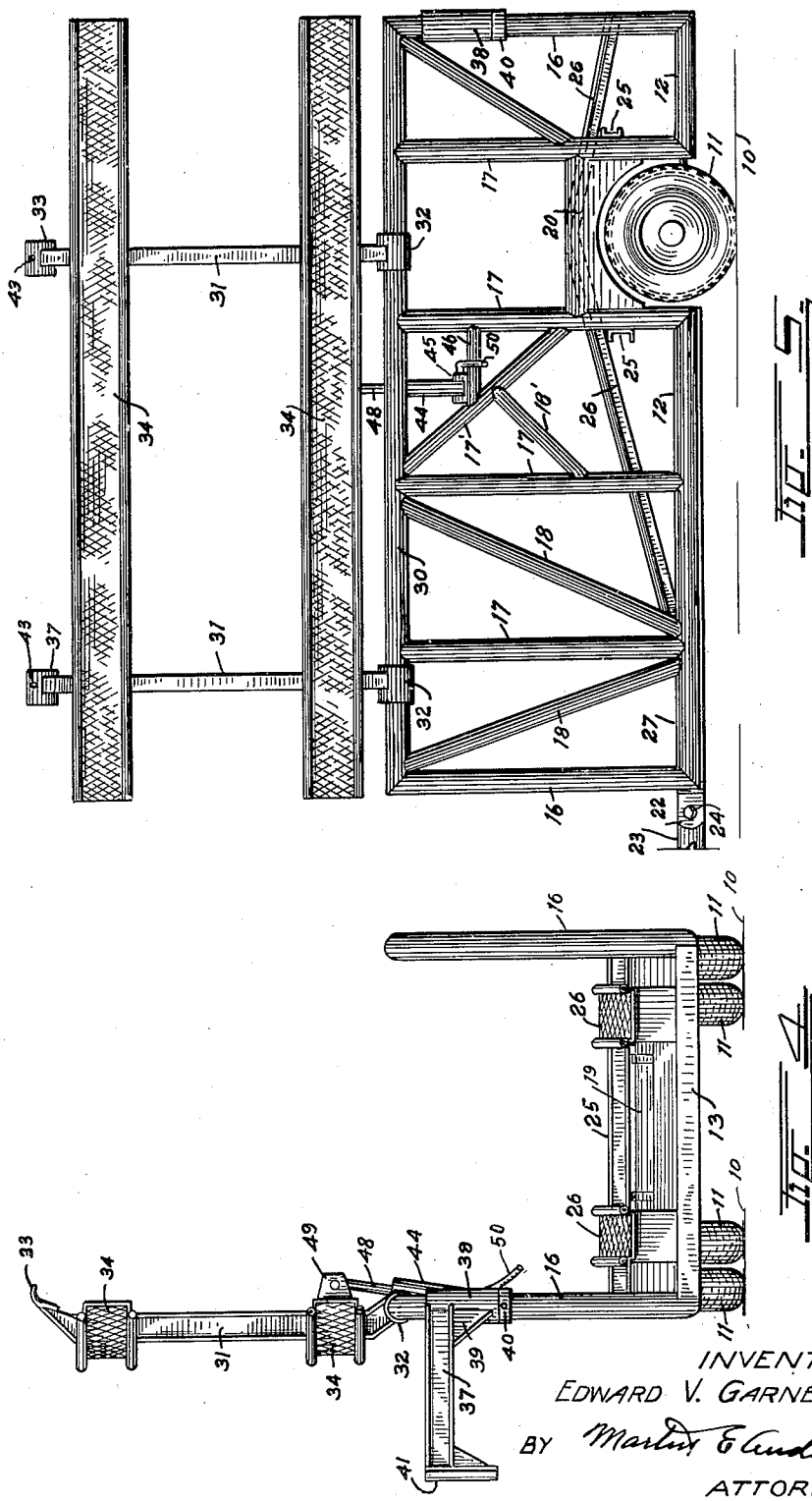

Jan. 3, 1950 E. V. GARNETT 2,492,980
TRAILER FOR TRANSPORTING AUTOMOBILES
Filed March 10, 1947 3 Sheets-Sheet 3
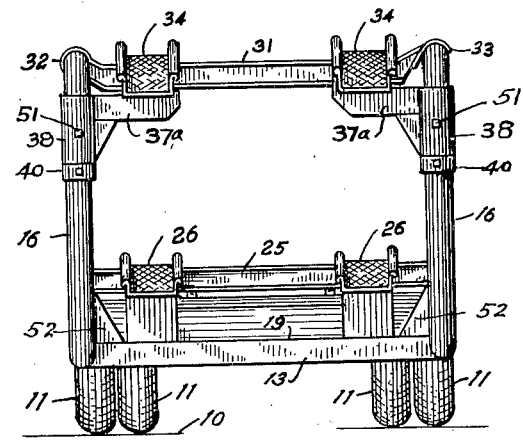
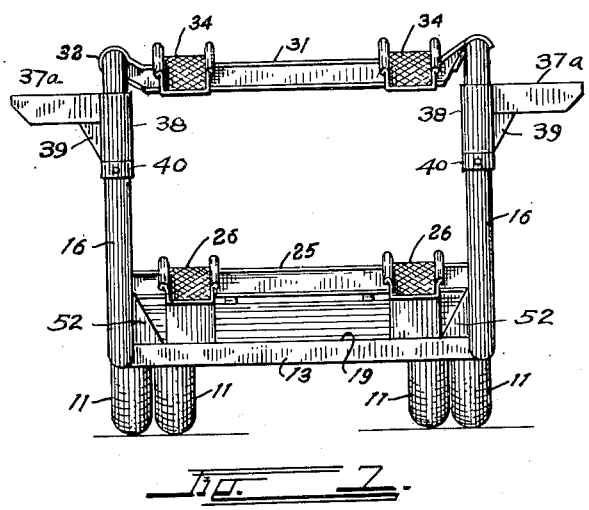
INVENTOR.
EDWARD V. GARNETT.
BY Martin E. Anderson
ATTORNEY.

Patented Jan. 3, 1950

2,492,980

UNITED STATES PATENT OFFICE 2,492,980

TRAILER FOR TRANSPORTING AUTOMOBILES

Edward V. Garnett, Denver, Colo.

Application March 10, 1947, Serial No. 733,535

5 Claims. (Cl. 296—1)

1

This invention relates to improvements in trailers for transporting automobiles.

At present it is customary to transport automobiles from the factory to the agencies located in different parts of the country, by automobile trucks, instead of by railway, as was formerly the practice.

Since the profits derived from such trucking depend, other things being equal, on the number of automobiles carried by each transportation unit, it is customary to attach to the truck a trailer constructed to carry two automobiles.

Safety for other highway users demands that trucking units must not exceed some specified length and height and for this reason trucks and trailers must be carefully designed and planned to come within the prescribed size limits and still carry the maximum load.

Many factors enter into the problem of truck and trailer design, one of which is to keep the height of the loaded trailer as low as possible. Another factor is convenience in loading and unloading the automobiles.

The present invention relates to the design and construction of the trailer of an automobile transportation unit. One object is to produce a trailer of such design that when it is loaded with two automobiles, it will have the lowest practical total height.

Another object is to produce a trailer of such construction and design that the automobiles may be loaded and unloaded with the expenditure of the least time and labor.

The above objects, as well as any others that may become apparent as this description proceeds are attained by means of a construction and an arrangement of parts that will now be described in detail, and for this purpose reference will be had to the accompanying drawings in which the invention has been illustrated, and in which:

Figure 1 is a top plan view of the improved trailer;

Figure 2 is a side elevation;

Figure 3 is an end elevation;

Figure 4 is an end elevation showing the parts in position for loading and/or unloading the lower automobile;

Figure 5 is a side elevation with the upper automobile supporting deck in raised position;

Figure 6 is an end elevation, similar to that shown in Figure 3, but illustrates a slight modification; and Figure 7 is a view showing some of the parts of Figure 6 in a different position.

2

In the drawing reference numeral 10 designates the ground or any other supporting surface and reference numeral 11 designates the wheels of the trailer.

The trailer comprises a frame having side members 12, a rear end member 13 and transverse frame members 14. There are other transverse frame members which have not been shown, but which are not pertinent to this description. The wheels are interconnected by an axle which has been indicated by reference numeral 15 in Figure 2.

Extending upwardly from each corner of the frame, are vertical posts 16 and a plurality of other vertical posts or frame members that have been designated by reference numerals 17. Diagonal brace members 18 are provided for strength wherever necessary. One of the diagonal brace members has a strengthening strut 18′ to enable it to resist exceptional forces which will hereinafter be referred to. The rear axle is usually covered with a plate 19, and fenders 20 are provided over the wheels as shown.

Two tension bars 21 are connected to the intermediate frame member 14 and project forwardly, terminating at 22, where they are connected with the pull bar 23 of the tractor, by means of a pivot 24. The tractor itself has not been shown, but its position is indicated by the pullbar. Secured to the vertical frame members at the front and rear of wheels 11 are channel irons 25 that support the inclined tracks 26, the front ends of which terminate in a supporting floor or plate 27. The inclined tracks form the support for an automobile whose front and rear wheels have been indicated by broken lines and which are designated by reference numeral 28. In order to load the automobile onto the trailer, a ramp like that indicated by dotted lines 29, in Figure 2, is provided and the automobile pulled up and onto tracks 26 by suitable means such as a winch provided for the purpose, or by ordinary ropes arranged in fall and tackle.

The automobile, when in place, occupies a position underneath the upper deck whose construction will now be described, but it is evident that it cannot be brought into a loaded position while the deck is in the position shown in Figures 1 to 2, because, when the front wheels pass over the high points of the supporting tracks, the top of the automobile will extend over the side frames whose top members have been designated by reference numeral 30. In order to make it possible to support a second automobile, and to conveniently load and unload the lower automobile, the upper deck has been constructed in a manner as follows:

Transverse frame members 31 of which two have been shown, are provided at one end with tubular hinge members 32, that encircle the corresponding frame member 30 so as to form a hinged connection. The other ends of the transverse members have curved plates 33 that overlap the upper frame member 30, when in their lowermost position. Tracks or ramps 34 are supported on the transverse frame members 31 and have an upwardly curved central portion which has been designated by reference numeral 35 in Figure 2. The wheels of the upper car are supported approximately at the points designated by the broken line circles 36. Since the loading of the car on the lower tracks or ramps necessitates the removal of transverse frame members so as to form an open space like that shown in Figure 4, it is evident that the two side frames can have no permanent transverse interconnection. Good engineering, and the dictates of safety, however, require that the side frames shall be interconnected so as to form a rigid structure and to prevent spreading.

Referring now more particularly to Figure 3, attention is called to beam 37 that is provided at one end with a tubular hinge member 38 that is welded thereto and braced by means of a gusset plate 39. A collar 40 is fastened to vertical frame member 16 and limits the downward movement of tubular member 38. Beam 37 extends across the frame and is provided at its free end with a slightly curved plate like that designated by reference numeral 41, which is welded to the beam and braced by a gusset plate 39'. Bolts 42 serve to hold plate 41 in rigid relation with the opposite vertical frame member 16. This gives a firm interconnection between the two side frame members. Beam 37 also serves as a support for the rear ends of tracks 34 in a manner as shown quite clearly in Figure 3. The curved plates 33 are also provided with openings for the reception of securing bolts 43, so that when the upper deck is in the position shown in Figure 2, the transverse frame members 31 will rigidly interconnect the side frames.

The upper deck being made of quite large steel bars and beams, which makes it heavy, it would be very difficult to turn it from the position shown in Figure 3 to that shown in Figure 4 in the absence of mechanical means.

In order to control the movements of the upper deck, a hydraulic mechanism has been provided. This mechanism consists of a cylinder 44 that is pivoted at its lower end in a bracket 45 carried by the transverse frame member 46. The piston rod, which has been designated by reference numeral 48, is connected to a downwardly extending bracket 49 on the upper deck. Conduit 50 connects the hydraulic cylinder with a suitable source of high pressure fluid, such a source being an ordinary high pressure oil pump of the type commonly employed in connection with tractors and automotive vehicles controlled by means of high pressure oil. The upper deck may be tilted about the axis of frame member 30 and lowered without necessitating the exertion of any considerable force by the operator. Suitable valves are, of course, provided in the high pressure fluid line so that the piston may be locked in any intermediate position and so that the return of the oil and the speed at which the upper deck is returned to normal position can be regulated. These valves and connections have not been shown because they are well understood by people versed in this art.

Let us now assume that the parts of the trailer are in the position shown in Figures 1 to 3 and that it is desired to load two automobiles onto it. The operator first releases bolts 43, after which he directs high pressure liquid into the hydraulic cylinder, whereupon the upper deck is slowly turned from the horizontal position shown in Figure 3 to the vertical position shown in Figure 4. The valves are then closed so as to hold the deck in that position as long as desired. Bolts 42 are now removed from plate 41, after which the latter is swung outwardly into the position shown in Figure 4. Ramps 29 are put into position and an automobile pulled up onto tracks 26 until it occupies the desired position, which has been roughly indicated by dotted circles 28. The automobile is then clamped in position by suitable means. Beam 37 is now returned to the position shown in Figure 3 and bolts 42 reinserted, after which the upper deck is returned to horizontal position by releasing the oil or other liquid in the cylinder. Bolts 43 are now reinserted and the whole assembly is thus made solid and rigid. Ramps corresponding to those indicated by reference numeral 29 are now positioned against the rear ends of tracks 34, after which the automobile which is to occupy a position on the upper deck is pulled into place by suitable means and clamped to the tracks. The trailer is now completely loaded and when it reaches its destination the upper automobile is first removed, after which the deck is turned into the position shown in Figure 4 and beam 37 is turned outwardly, after which the lower car is removed.

In the drawing a hydraulic mechanism has been shown for tilting the upper deck because such a mechanism is simple and effective. It is to be understood, however, that applicant does not desire to be limited to this because other mechanical equivalents may be substituted.

In Figures 6 and 7 a slight modification of the construction has been illustrated.

It has been found that some of the larger cars are so built that the transverse brace bar 37 shown in Figure 3 will interfere with the loading of the lowermost car. It has been found necessary to make the bar 37 in two parts instead of one as shown in Figure 3.

In Figures 5 and 6, the two members that have been substituted for brace bar 37 have been designated by reference numerals 37a and are each hinged to the adjacent end post by the same hinge construction as illustrated in the embodiment previously described. Pins 51 have been provided to anchor the support members 37a against accidental rotation.

Since bar 37 shown in the other figures also serves as a brace preventing the accidental outward movement of the vertical frames, gusset plates 52 have been provided to give such stability to the frame in place of depending on the bracing action of bar 37.

With the construction shown in Figures 6 and 7, accommodations can be had for cars having very high engine hoods, as some of the present cars today are constructed.

The support members 37a may be moved outwardly as shown in Figure 7 when loading the lowermost car and are then swung inwardly to the position shown in Figure 6. Any anchoring means in addition to pins 51 may be used or substituted for pins 51, if desired.

Having described the invention what is claimed as new is:

1. A trailer for use in transporting automobiles, comprising an elongated horizontal wheel supported frame, having each side provided with a vertical frame, two spaced tracks on the horizontal frame, a brace bar having one end mounted adjacent the top and on the end of one vertical frame, for pivotation in a horizontal plane, means for securing the free end to the corresponding end of the other vertical frame adjacent the top thereof, at least two beams having one end pivoted to the top of one side frame, the other ends resting on the top of the other side frame, two spaced tracks secured to the beams in position to support an automobile, and means comprising a hydraulic mechanism for tilting the last named beams and tracks about their pivotal connection with the side frame.

2. A trailer for transporting two automobiles in superposed relation, comprising an elongated horizontal wheel supported frame, a vertical frame rigidly mounted along each side of said wheel-supported frame, spaced tracks carried by the horizontal frame, a top automobile supporting deck comprising, a plurality of beams pivotally connected at one end with the top of one side frame, the other ends having means overlapping the top of the other side frame, two spaced parallel tracks secured to the beams, for the support of an automobile, means for tilting the beams and tracks from horizontal to substantially vertical positions, a brace bar having one end connected with an end of one side frame adjacent the top thereof, and means at the other end of said brace bar for effecting a rigid connection with the corresponding end of the other end member adjacent the top of the latter, the brace bar serving as a support for the tracks and as means for rigidly interconnecting the side members.

3. A trailer for use in transporting two automobiles in superposed relation, comprising, an elongated wheel supported horizontal frame, a pair of spaced parallel tracks supported on the frame in position to receive the wheels of an automobile, a vertical frame on each side of the horizontal frame, each vertical frame comprising a top bar connected with the horizontal frame by end and intermediate posts, a deck for supporting a second automobile comprising at least two beams pivotally connected at one end with the top bar of one side frame, the other ends having means for overlapping the top bar of the other side frame and for effecting an interconnection therewith, two wheel supporting tracks secured to the pivoted beams, in position to support a second automobile, a hydraulic mechanism for turning the upper deck about its pivot, and means for bracing the side frames against transversely acting forces, comprising a bar hinged to the rear end post of one side frame adjacent the top thereof, for horizontal pivotal movement into and means for securing the free extremity of said bar to the corresponding end post of the other side frame adjacent the top of the latter.

4. A trailer for use in transporting two automobiles in superposed relation, comprising an elongated horizontal wheel supported frame positioned in a plane at the height of the centers of the supporting wheels, a pair of spaced tracks carried by the frame, the tracks having their front ends at the level of the frame, an intermediate portion above the centers of the wheels, the rear ends being downwardly inclined, the horizontal frame having vertical frames, along its sides, each side frame having a top bar connected with the horizontal frame by vertical end and intermediate posts, an upper automobile supporting deck comprising at least two beams having one end connected for pivotation with the top bar of one side frame and the other end resting on the top bar of the other side frame, two spaced tracks secured to the pivoted transverse beams, in position to support an automobile, hydraulic means associated with one side frame and the pivoted deck for turning it about its pivotal connection, and a horizontal transverse bar having one end pivoted to the end post adjacent the top of the latter for swinging movement towards and away from the end post of the other frame, and means for rigidly attaching the free end of the swinging bar to the end post with which it contacts adjacent the top of the latter.

5. A trailer for transporting two automobiles in superposed relation, comprising an elongated horizontal wheel supported frame, a vertical frame rigidly mounted along each side of said wheel-supported frame, spaced tracks carried by the horizontal frame, a top automobile supporting deck comprising, a plurality of beams pivotally connected at one end with the top of one side frame, the other ends having means overlapping the top of the other side frame, two spaced parallel tracks secured to the beams, for the support of an automobile, and means for bracing the side frames to resist outwardly acting forces.

EDWARD V. GARNETT.

REFERENCES CITED

The following references are of record in the file of this patent:

UNITED STATES PATENTS

| Number | Name | Date |
| --- | --- | --- |
| 1,229,714 | Clark et al. | June 12, 1917 |
| 1,809,557 | Lishon | June 9, 1931 |
| 1,994,695 | Dolan et al. | Mar. 19, 1935 |
| 2,004,437 | Judd | June 11, 1935 |
| 2,096,455 | Francis | Oct. 19, 1937 |